US009600951B2

(12) United States Patent
Kisters

(10) Patent No.: US 9,600,951 B2
(45) Date of Patent: Mar. 21, 2017

(54) SECURITY ELEMENT FOR MARKING OR IDENTIFYING OBJECTS AND LIVING BEINGS

(71) Applicant: Human Bios GmbH, Kreuzlingen (CH)

(72) Inventor: Friedrich Kisters, Kreuzlingen (CH)

( * ) Notice: Subject to any disclaimer, the term of this patent is extended or adjusted under 35 U.S.C. 154(b) by 128 days.

(21) Appl. No.: 14/264,687

(22) Filed: Apr. 29, 2014

(65) Prior Publication Data

US 2014/0231511 A1 Aug. 21, 2014

Related U.S. Application Data

(60) Division of application No. 13/351,830, filed on Jan. 17, 2012, now abandoned, and a continuation of application No. PCT/EP2010/004270, filed on Jul. 14, 2010.

(30) Foreign Application Priority Data

Jul. 14, 2009 (DE) ........................ 10 2009 033 221

(51) Int. Cl.

*G06K 9/00* (2006.01)
*G07C 11/00* (2006.01)
*B42D 25/405* (2014.01)
*B42D 25/29* (2014.01)

(52) U.S. Cl.

CPC .............. *G07C 11/00* (2013.01); *B42D 25/29* (2014.10); *B42D 25/405* (2014.10); *B42D 2035/34* (2013.01); *Y10T 29/49* (2015.01)

(58) Field of Classification Search

None
See application file for complete search history.

(56) References Cited

U.S. PATENT DOCUMENTS 2,612,456 A 9/1952 Thacker et al.
4,218,674 A 8/1980 Brosow et al.
5,262,365 A * 11/1993 Oyobe ................ C03B 19/1438 501/37
5,433,807 A * 7/1995 Heckenkamp ... G06K 19/06046 156/230
6,022,429 A 2/2000 Hagstrom
(Continued)

FOREIGN PATENT DOCUMENTS

CN 200 993 847 Y 12/2007
DE 38 43 076 A1 7/1990
(Continued)

*Primary Examiner* — Randolph I Chu
(74) *Attorney, Agent, or Firm* — Muncy, Geissler, Olds & Lowe, P.C.

(57) ABSTRACT

A security element for marking, authenticating or identifying objects or living beings, such as people, animals or plants is provided that includes one or more layers of materials that are arranged next to or on top of each other or that overlap, which have security markings. At least one layer of the security element has, at least regionally, a crackle pattern in form of tears or cracks, nicks, wear areas or shrinkages and possible impurities, which can be scanned and detected together or separately as security features. A method for producing such a security element and to a use thereof for authenticating a person or an object, or for authorizing, triggering, continuing, carrying out and ending an action is also provided.

20 Claims, 3 Drawing Sheets

(56) References Cited

U.S. PATENT DOCUMENTS

| | | | | |
|---|---|---|---|---|
| 6,153,339 | A * | 11/2000 | Huston .................... | G03H 1/02 359/3 |
| 6,264,296 | B1 | 7/2001 | Klinefelter et al. | |
| 6,685,312 | B2 | 2/2004 | Klinefelter et al. | |
| 6,932,527 | B2 | 8/2005 | Pribula et al. | |
| 6,979,141 | B2 | 12/2005 | Karst et al. | |
| 7,037,013 | B2 | 5/2006 | Klinefelter et al. | |
| 7,301,682 | B1 | 11/2007 | Puttkammer | |
| 8,878,844 | B2 * | 11/2014 | Kaule ........................ | B44F 1/10 345/420 |
| 2004/0212302 | A1 * | 10/2004 | Letz ........................ | C03C 3/062 313/512 |
| 2005/0006481 | A1 * | 1/2005 | Han ..................... | G06K 19/045 235/487 |
| 2008/0037131 | A1 * | 2/2008 | Steenblik .................. | B44F 1/10 359/619 |
| 2009/0115185 | A1 | 5/2009 | Hoffmuller et al. | |
| 2009/0200791 | A1 * | 8/2009 | Despland .................. | B44F 7/00 283/85 |
| 2009/0321623 | A1 * | 12/2009 | Ross ...................... | C09D 11/03 250/271 |
| 2010/0208036 | A1 * | 8/2010 | Kaule ....................... | B44F 1/10 348/46 |
| 2010/0307705 | A1 * | 12/2010 | Rahm .................... | B42D 25/00 162/140 |
| 2011/0007934 | A1 | 1/2011 | Springmann et al. | |
| 2012/0020620 | A1 * | 1/2012 | Wu .................... | G02B 6/29313 385/33 |
| 2012/0319395 | A1 * | 12/2012 | Fuhse .................. | G02B 5/1842 283/67 |
| 2013/0099474 | A1 * | 4/2013 | Fuhse .................. | B42D 25/342 283/85 |
| 2014/0353959 | A1 * | 12/2014 | Lochbihler .............. | G02B 5/08 283/85 |
| 2015/0352884 | A1 * | 12/2015 | Fuhse .................... | B42D 25/29 283/91 |

FOREIGN PATENT DOCUMENTS

| | | | |
|---|---|---|---|
| DE | 198 10 134 | A1 | 7/1999 |
| DE | 199 28 060 | A1 | 12/2000 |
| DE | 102 04 870 | A1 | 8/2003 |
| DE | 10 2005 028 162 | A1 | 12/2006 |
| DE | 10 2006 015 023 | A1 | 10/2007 |
| DE | 10 2007 020 982 | A1 | 10/2008 |
| DE | 10 2008 012 426 | A1 | 5/2009 |
| EP | 0 919 916 | A2 | 6/1999 |
| EP | 1 327 531 | A1 | 7/2003 |
| EP | 1 748 902 | A1 | 11/2005 |
| EP | 1 674 286 | A1 | 6/2006 |
| EP | 1 934 950 | B1 | 10/2009 |

* cited by examiner

SECURITY ELEMENT FOR MARKING OR IDENTIFYING OBJECTS AND LIVING BEINGS

This nonprovisional application is a divisional of U.S. application Ser. No. 13/351,830, filed on Jan. 17, 2012, which is a continuation of International Application No. PCT/EP2010/004270, which was filed on Jul. 14, 2010, and which claims priority to German Patent Application No. DE 10 2009 033 221.9, which was filed in Germany on Jul. 14, 2009, and which are all herein incorporated by reference.

BACKGROUND OF THE INVENTION

Field of the Invention

The present invention relates to a security element for marking, authenticating, or identifying objects, particularly documents, securities, stamps, labels, bank bills, bank notes, identity documents, personal identity cards, other ID cards, passports, (chip) cards, access cards, credit cards, access control cards, tickets, driver's licenses, vehicle documents, bank notes, checks, postage stamps, labels, vignettes, paintings, art objects, furniture, measuring devices, machine parts, machines, vehicles; cameras, cell phones, computers, computer-like devices, data storage media, printed materials, books, fabric, fashion items and sporting goods, technical devices, tools, paper and cardboard boxes, packaging, as well as products and the like, or living beings such as persons, animals, or plants. The invention relates further to a method for producing a security element of this type, the use thereof for authenticating a person or an object or for authorizing an action, and to a method for labeling, authenticating, or identifying an object or a living being.

Description of the Background Art

Security-relevant objects, such as, e.g., documents, personal identity cards, and passports, as a rule comprise security features with individualized or personalized information, which are to enable an assignment of the object to a specific person. In a simple form, such personalized information is available as image information, e.g., passport photograph, biometric features, or other features such as, e.g., name, address, or date of birth of the person. This information, however, enables an absolutely certain identification of the carrier only conditionally and can be ferreted out or forged with more or less great effort.

To protect against fraud or to make objects forgery-proof, security features are applied or introduced either to or into the object. However, because of the available possibilities for forgery, the absolutely certain assignment of such security elements has remained an unresolved problem thus far.

Security elements of this kind are described, for example, in DE 198 10 134 A1 and DE 3 843 076 A1, EP 1 934 950 A1 (which corresponds to US20090269519), EP 1 748 902 A1 (which corresponds to US20070116937), EP 1 674 286 A1 (which corresponds to US20090127845), EP 1 327 531 A1 (which corresponds to US20050117185), and EP 919 916 B1, and U.S. Pat. No. 6,022,429, U.S. Pat. No. 6,264,296, U.S. Pat. No. 6,685,312, U.S. Pat. No. 6,932,527, U.S. Pat. No. 6,979,141, and U.S. Pat. No. 7,037,013. The U.S. patents mentioned last disclose methods in which ink-jet printing is applied to blanks, the printing which is to be protected with a protective coating or a protective film as protection from mechanical and/or chemical damage and manipulations. The personalized and/or individualized information is stored typographically in the security or value document. Such printed security or value documents, however, provide only some protection from manipulations, because the protective lacquer layer can be easily loosened and/or removed and thus an effect on the printed image is possible. Further, an identical printed image with an identical protective lacquer can be applied to a forgery, as a result of which the forgery can no longer be distinguished from the original. Determination of authenticity is not possible or possible only with great effort.

In DE 10 2008 012 426 A1, which corresponds to US 20110007934, image information for the protection of documents is inserted in at least two layers of the document. The image information contains digital watermark information, whereby only the totality of the digital watermark information in the at least two layers forms a security feature for authenticating the document. This system is not forgery-proof either. The layers can again be produced to be identical or deceptively similar. In addition, the identity cannot be unequivocally assigned to a specific person. False negatives and operator-, user-, or transmission-related errors also continue to be possible.

Another type of security element is described in DE 10 2007 020 982 A1, which makes use of the fact that known visual markings with micro assemblies for a configuration comparison between an original and imitation are based on two- or three-dimensional geometric patterns; these are always realized according to predefined rules, so that imitation of these selectively produced micro assemblies is still possible.

DE 10 2006 015 023 A1, which corresponds to US 20090115185, describes a security element for security papers, value documents, and the like with a diffraction structure, which has an embossed relief structure and a coating layer increasing the security of the diffraction effect of the embossed relief structure. The relief structure is formed based on a cholesteric, liquid crystalline material, and the coating layer contains a reflecting and/or a high-index layer. These methods in principle deal with a combination of the embossed stamp, known since the Middle Ages, with a likewise long-known overlying seal stamp.

DE 10 2005 028 162 A1 describes a security element for the protection of valuable articles with a first and a second authentication feature. The first authentication feature comprises a first arrangement with a plurality of lens-shaped elements, which are present in a raster, and a second arrangement with a plurality of microscopic structures, which are present in a second raster. The first and second arrangements are arranged in this case in such a way that the microscopic structures of the second arrangement, when viewed through the lens-shaped elements of the first arrangement, are to be seen enlarged. The second authentication feature can be examined mechanically and/or visually and is not influenced by the first arrangement of the first authentication feature.

These rasters can also be forged in that the structures are read and accordingly reapplied to a forgery. It must be considered in this case that a forgery needs to convey only the impression of authenticity, therefore could be applied only in one layer, which the combination of both rasters reproduces as they would be read by the reader also in the case of the original. It is sufficient as a result to read an original with a suitable reader to produce this type of forged layer, which would then also be classified as an original by the next original reader.

Regardless of the problem of forgery security, many of the named security elements mention only a limited number of security markings. The security can be increased the more security markings are combined in a security element. This type of approach is described in DE 199 28 060 A1, which corresponds to U.S. Pat. No. 7,301,682. The security element relates to an optically variable security feature for introduction into the paper web of documents, security papers, bank notes, packaging, and products. This deals particularly with holograms in which an electrically conductive marking substance is applied to a supporting film, whereas the reflecting layer contains another marking substance that is detectable by physical means but not perceptible by human vision. At least one electrically conducting polymer and a film-like reflecting layer containing metallic pigments are applied to the supporting film. The diffractive structures are to be embossed in a subsequently cured coating layer. This production process, nevertheless, does not represent protection from copies, because all originals retain their specific security features and these can ultimately be reconstructed.

The aforementioned existing methods for authentication (access control) of persons or for marking of originals are inflexible, on the one hand, because they include predefined authentication steps. On the other hand, they do not include any effective mechanism for protection against forgery. In addition, existing systems are not capable of determining who an authorized person is, because they only compare information that they receive. For example, an ID or access card is compared with data in a database, regardless of whether the ID holder is in fact the authorized person or not. Apart from false-negative cases, false-positive cases are also a daily problem. If, for example, the actual authorized person has forgotten a PIN code or a secret code, then this person is denied access although this involves the correct person. Conversely, a person who is not authorized, for example, can withdraw money at an ATM machine with a stolen debit card with the aid of the secret code, although this person is not authorized to make a withdrawal (false positive). Current systems are based on password-protected, physical, or biometric security features. This type of three-factor authentication is not sufficient, however, because false negatives and other discrepancies can continue to occur. Further, the consistency of the transmitted data is not checked, which enables possible hacker attacks. The identity is cross-checked with non-system relevant factors, which enables system-based errors.

Intelligent systems are intended to make it possible that the authorized person himself has access, when he does not remember the PIN code or secret code, because he can be authenticated based on other non-forgeable features.

SUMMARY OF THE INVENTION

It is therefore an object of the present invention to provide a security element that contains a forgery-proof security feature, which enables a unique, individual marking, authentication, or identification of an object or a living being and permits authentication of a person or an object, or authorizes the initiation, continuation, carrying out, or ending of an action.

An aspect of the present invention is the utilization of intentionally introduced or random surface structures or material structures, which are part of the security element, an object, or a person. These include topographic structures according to the invention in the form of crackles such as tears and cracks, nicks, shrinkages, wear areas, or soiled areas, which are already present, introduced or artificially generated by chemical or physical processes or methods or made manipulable in at least one or more layers of the security element.

In this application, the recited surface features or material properties such as crackles, cracks, tears, nicks, wear areas, shrinkages, and/or soiled areas are combined together in the term "crackle pattern."

An aspect of the invention therefore is the utilization of crackle structures in the form of tears or cracks. Another aspect is the utilization of shrinkages, which can also arise (like crackles) as a result of primary or secondary drying events. An additional aspect of the invention is the evaluation of surface structures as another security feature, particularly of smaller/larger laminar flaking of one or more layers (nicks). Further, soiled or wear areas can also be used as a security feature.

Furthermore, according to an embodiment of the invention a method for marking, authenticating, or identifying objects or living beings is provided, which is based on the examination and analysis of crackle patterns (including nicks, shrinkages, wear and soiled areas).

The invention provides a security element in which at least one layer of the security element at least in areas has a crackle pattern in the form of tears or cracks, nicks, wear areas, or shrinkages and the possible soiling thereof, and which can be scanned and acquired together or separately as a security feature.

The present invention relates further to a method for producing a security element of the invention for marking, authenticating, or identifying objects, particularly documents, securities, stamps, labels, bank bills, bank notes, identity document, personal identity cards, other ID cards, passports, (chip) cards, access cards, credit cards, access control cards, tickets, driver's licenses, vehicle documents, bank notes, checks, postage stamps, labels, vignettes, paintings, art objects, furniture, measuring devices, machine parts, machines, vehicles, cameras, cell phones, computers, computer-like devices, data storage media, printed materials, books, fabric, fashion items and sporting goods, technical devices, tools, paper and cardboard boxes, packaging, as well as products and the like, or living beings such as persons, animals, or plants, comprising one or more layers arranged next to or above one another or overlapping layers of materials, which can contain security markings, characterized in that in at least one layer of the security element at least in areas a crackle pattern in the form of tears or cracks, nicks, shrinkages, wear or soiled areas is generated, influenced, or made manipulable, said pattern which can be scanned and acquired together or separately as a security feature.

Apart from the marking, identifying, and authenticating of an object or a living being, the security element or method of the invention can also be used for authorizing, initiating, continuing, carrying out, or ending an action. Action can be understood to be, for example, access control to or authorization for carrying out a process.

Crackle (French: craquele) describes a mesh-like network of tears or small cracks on the surface of objects such as works of art, paintings, gemstones, coating layers, glass surfaces, or ceramic items. Craquelure is also used on occasion in regard to paintings. Particularly in the case of art objects, the crackle can be caused by age; it is also often artificially created as an effect as a tool in the visual arts.

Oil paintings, painted surfaces, and ceramic objects often have crackles caused by the drying process and the associated volatilization of the binding agents. From the technical perspective, these are stress cracks, which arise as a result of the loss of material during the drying process, whereby depending on the binding agent this can be a rapid or a very slow drying process extending over several years. Later effects can also affect these crackles. For example, they are increased if the object is exposed to climatic changes. With changes in humidity, the substrate expands (e.g., the wood panel by up to about 2 cm per meter in width) or accordingly contracts. The expansion coefficients of the layers above the supporting material and that of the supporting material are different. Conversely, the adhesion forces between the layers above the supporting material and the supporting material are very strong. This leads to horizontal stresses, which can be greater than the forces that hold the layers together and as a result lead to new stress cracks in these layers above the supporting material, whereby the stress cracks can affect all or only individual layers. Because, for example, different paints or coatings can absorb no or only little moisture from the surroundings, they do not adapt sufficiently to the humidity-induced expansion movements of the substrate. Stresses and cracks again arise as a result. In the worst case, the binding forces between the layers of paint, on the one hand, and the substrate, on the other, are too weak; this can lead to small to large flaking off of paint, which can affect only one or several layers.

Many artists use a crackle finish paint (brittle lacquer), with which artificial stress and thereby an immediate artistic crackle effect can be created. Crackle finish paint contracts during the drying process, as a result of which a fine pattern of tears forms. As a result, an antique or historical appearance should be achieved.

In the case of crackle, early shrinkage cracks and age-related cracks are basically distinguished, which alone can be differentiated even visually. Early shrinkage cracks occur during the primary, relatively rapid drying process, whereas the age-related cracks begin during or after the secondary drying process. Early shrinkage cracks frequently have especially pronounced forms, are spider web-like, concentrically oriented or flame-like, not continuous, or often limited to the particular drying paint layer or protective layer (e.g., varnish layer), whereas age-related cracks usually cross all color layers. Age-related cracks frequently arise as a result of external effects such as, for example, the changing, movement, shrinkage, or swelling of an underlying layer or the supporting layer. Depending on the decrease in bending or swelling behavior of this layer, age-related cracks in this layer or an underlying or overlying layer can occur, which can also lead to a localized or extensive separation of the layers, which is ultimately noticeable as defects. In such cases, pressure cracks also occur, which often lead to grid structures. Further cracks occur if a layer moves, depending on the condition of the layers. The more age-related cracks a layer has, the more flexible it becomes. The age-related cracks can be ascribed to so-called micropores and micro-tears during the creation of the picture. Selective age-related crack formation can be introduced by selective application of such micropores and micro-tears. The thus arisen cracks cannot heal; i.e., existing age-related cracks can be restored only at considerable cost and are virtually irreversible. This also usually applies to the aforementioned early shrinkage cracks. The edges in early shrinkage cracks are generally (considerably) more even than in age-related cracks. Because of the complex causes that could lead to crackle formation, their appearance is usually unique, particularly also in the case of a continuing process of change.

Shrinkages, apart from crackles or nicks, can also lead to a pattern, whereby not the tears but the raised areas represent the characteristic features here. They can also form crackles as a result. Yet tear or crack formation need not occur in every instance. Such shrinkages generally arise during the primary drying process, whereby the paint layer shrivels like a skin, therefore warps. This can occur with or without a tearing surface. The horizontal tensile forces are generally greater here than the vertical adhesion forces, which leads to a contraction of the material. Shrinkages of translucent substances are detectable visually through color changes; this becomes apparent particularly in an analysis with different lighting or different scan angles such as an oblique scan angle or scanning from above. Shrinkages can also form flat patterns, wave patterns, or furrows. They can be created selectively, for example, by high binding agent concentrations. Shrinkages, apart from crackling and nicks and other parameters detectable in a condition report, are also regarded as a security feature, can be entered in databases, and used for identifying or marking of objects or persons.

Crackle tears, nicks, or shrinkages are properties that often affect several layers and therefore are usually spared from surface treatments or continue to exist. Apart from the crackle pattern and its nicks and/or shrinkages and/or traces of use and/or soiling, the entire surface topography or material quality on or in the interior of a layer with all features can be used basically as an additional security feature, however, because it also changes over time and/or with further use because of continuing adjustments in crackle formation, shrinkages, or other fractures and flaking or wear or soiled areas. Concentration on easily acquirable elements such as the mentioned crackles, nicks, or shrinkages is preferable, however. In an embodiment, therefore, instead of or in addition to the crackles, nicks, wear and soiled areas, or shrinkages, other features of the surface topography of one or more layers are analyzed and/or acquired.

In a first aspect, therefore, the security element of the invention comprises one or more layers arranged next to and/or above one another and made of materials, which may contain one or more security markings, whereby at least one layer has at least in areas a crackle pattern in the form of tears or cracks, nicks, shrinkages, or wear areas with or without soiling, which can be scanned and acquired as a security feature.

The term "object" in this context can be understood to be any item that can be marked or used for marking other items or has security-relevant importance. These include, for example, documents, securities, stamps, labels, bank bills, bank notes, identity documents, personal identity cards, other ID cards, passports, (chip) cards, access cards, credit cards, access control cards, tickets, driver's licenses, vehicle documents, bank notes, checks, postage stamps, labels, vignettes, paintings, art objects, furniture, measuring devices, machine parts, machines, vehicles, cameras, cell phones, computers, computer-like devices, data storage media, printed materials, books, fabric, fashion items and sporting goods, technical devices, tools, paper and cardboard boxes, packaging, as well as products and the like.

The present invention also utilizes existing crackles, nicks, shrinkages, wear or soiled areas as well as the introduction and creation of artificial crackles (tears or cracks), nicks, shrinkages, wear or soiled areas, to create forgery-proof security features or to influence existing security features or to make them manipulable.

In this regard, already existing crackle patterns can also be used as an object or security element for analysis, examination, or evaluation according to the method of the invention. Further, these structures can be activated, initiated, changed, or promoted or their creation can be accelerated or stopped with the aid of the method of the invention described hereafter. Preferably, the security element of the invention represents a separate, isolable object with its own layer structure, whereby any material, such as, for example, plastic, paper, textiles, etc., can be used as a support for these layers. Further, the support can also be a color or lacquer layer.

The security feature layer can also be introduced directly into an object or a living being and together with it form, for example, two or more layers, which can be examined, as a support layer or layers. Apart from or instead of crackle patterns, other changes within the introduced security feature layer can also be examined and compared. These include, among others, changes in the pigment composition caused by internal or external influences, such as degradative reactions, bleaching, or distribution changes of introduced particles such as, for example, pigments or inflammatory reactions because of intolerability.

The crackle pattern, like a fingerprint, represents a unique, individual, specific structure, which can be conclusively assigned to a specific origin. By comparison of an existing or artificially created crackle pattern, a part thereof, or its dynamic development over a specific time period, an original can be differentiated from a forgery. Crackles, just like nicks, shrinkages, wear or soiled areas, can be applied as recognizable marks to an object and even to a living being (e.g., highly valuable stud horses, plants) and in this way act like a living watermark. Because of numerous changes, such as, for example, additional fractures and associated crackles, the specifically introduced feature cannot be detected by non-privy parties. Neither can prior conditions be reconstructed or future conditions surmised and lastingly copied. A forgery-proof security feature is provided based on stored patterns in databases and predefined scan regions.

Special security can be achieved by periodic updating of the original feature of the crackle pattern with new additional features such as crackles, nicks, shrinkages, and wear or soiled areas. Even identical forgeries can be identified in this way, because after some time they will again differ from the original as soon as new crackles, nicks, shrinkages, or wear or soiled areas are added (both in the original and also in the forgery, but different in each case). Accordingly, there is a continuous changing and updating of the database. Even if a hacker would succeed in reading stored data, he would only receive a snapshot of the crackle pattern. These old data again lose their value, however, because of the ongoing dynamic updating of the database and a forgery can be identified relatively quickly.

The term "crackle pattern-forming layer" in relation to the present invention is understood to be the layer or layers of the security element in which crackle patterns can form or are already present. In this regard, the crackles, nicks, wear areas, or shrinkages can definitely comprise several layers (e.g., deep tears or coarse flaking). It is therefore preferred in a variant that the crackle pattern of the security element extend over several layers, whereby the layers can be either identical or different in their structure or their composition.

Apart from the marking and identifying of objects, the security element of the invention is also suitable for marking living beings, for example, humans, animals, or plants. The security element can be applied, for example, as a stamp or removably via an adhesive label to the back of the hands of a person. In animals or plants, the security element can also be used for marking the original, which is highly relevant particularly in the area of breeding. It can also be combined with other features such as, for example, biometric features to ensure secure authentication of objects or living beings.

The crackle formation of the invention can be generated or influenced physically, magnetically, or chemically. Chemical crackle formation occurs, for example, by the introduction of chemical substances such as solvents or binding agents or mixtures thereof onto or into the relevant layer, which results in crackle formation. Preferably, such solvents or binding agents are used in liquid or gel-like form. As a result, solid and volatile (liquid) components are present alongside each other. The liquid components evaporate, i.e., volatilize over time. As a result, volume reduction in the affected areas occurs, which ultimately leads to surface tension. This surface tension in the material is often the cause for the tears and crevices forming later. If the drying and therefore the surface tension increase, the existing cohesive forces are not sufficient to hold a flat structure together. Tears form.

Apart from modern products, classical, preferred binding agents are, for example, complex polymers such as, for example, amino acid polymers. Further, natural polymers such as animal glues, casein, protein, and egg yolk are suitable. Also suitable are water-soluble polymers, which occur in considerable number in rubber derived from plants, such as, e.g., gum arabic, gum tragacanth, etc. Other examples are starches, guar gum, tamarind seeds, and other flax seeds. These substances are used primarily in watercolors, but also in miniatures, manuscripts, and other colorants, particularly those applied to paper.

Other preferred binding agents are oils and fats. Drying oils contain polyunsaturated fatty acids, which promote oxidation and polymerization and therefore are advantageous for the desired crackle formation. The use of waxes or resins is also possible such as, e.g., ozokerites, beeswax, or carnauba wax.

Further, all non-natural colorants, binding agents, solvents, or other usable substances are also suitable.

In an embodiment, the crackle formation can be initiated, promoted, or accelerated according to the selection of the layer composition also by a layer arranged above or beneath.

The crackle can vary in intensity depending on the layer thickness. For example, the crackle can be more intense in areas in which the layer is thicker, and less strong in areas in which the layer thickness is smaller. The layer thickness can thereby be used as a selective design tool to bring about the crackle. Depending on the type of employed solvent, this layer can dry either more rapidly or more slowly, which in turn means that the rate of crackle pattern formation can be influenced. This can be exploited if, for example, a document is to be valid only for a specific time period. If the crackle pattern in the database differs too greatly from the crackle pattern to be authenticated, then the document has expired, been manipulated, or forged. The pattern tolerance can be established by using a threshold value. Depending on the type of employed layer composition, the crackle effect can be more intense or less intense and thereby influence this time period. Depending on the physical or chemical method, the crackle can be set or undergo a dynamic aging process (a process of change or further development).

To generate an artificial crackle, in a preferred embodiment, asphalt, tar, or bitumen are used preferably.

Asphalt here designates a mixture of the binding agent bitumen and fine mineral substances or pigments. Especially preferred among asphalts is asphaltite with its very high bitumen content (or low mineral content). Bitumen is a naturally occurring mixture or a mixture that is produced by vacuum distillation from petroleum and includes various organic substances. Tar, like bitumen, is also a binding agent and has its origin in coal, however. Bitumen or tar, depending on the composition during or after curing, because of its material properties either shrinks itself or forms a crackle or (for example, in the case of asphalt) stimulates an underlying or overlying color layer to form crackles or to shrink.

Basically, any type of synthetic or natural asphalts, tar, or bitumen can be used, to influence the stress and drying behavior of the individual levels. The natural and synthetic asphalts, tar, or bitumen possess a number of positive properties, which can be influenced by their processing or oxidation or distillation. Three factors essentially are important for crackle formation in the case of asphalt, tar, or bitumen. On the one hand, there are material-related, internal factors, which can be attributed to the chemical composition of the colloidal structure of the bitumen and the content of mineral substances in the particular asphalt. Further, there are external factors, such as, for example, the temperature-related physical state of asphalt, tar, or bitumen. Finally, the film thickness of the coating also has an effect.

Because asphalts, tar, or bitumen become viscous to liquid by heating, the material can be easily applied as a layer to a substrate. After curing, depending on the composition, the material becomes a flexible or almost virtually glass-hard surface. The fractured surfaces during use of asphalt typically have a shell color and are glossy, but depending on the mineral content of the asphalt can be dull and have smooth fractures.

If desired, the melting point of asphalt, tar, or bitumen can be lowered by mixing with oils. The curing of asphalt depends on various factors. For example, the content of the mineral substances and direct contact with oxygen play a role, which can change (e.g., accelerate) the curing process. The situation is also similar with tar and pitch or other related substances. Bitumen can be mixed further with binding agents such as oils or tempera and applied as a color layer or film to a suitable substrate. In this respect, the mentioned petroleum residues with or without mixing with substances of artificial or natural origin can be used for generating a crackle.

As already noted, other color layers, which over time have pronounced, often radial early shrinkage cracks, can be applied to the asphalt, tar, or bitumen layers. In another embodiment, the crackle pattern, for example, the artificial crackle, the flaking, or shrinkage is initiated or influenced by the application or introduction of colorants, catalysts, solvents, or binding agents or solvent- and binding agent-containing substances or mixtures thereof and their subsequent evaporation in the crackle pattern-forming layer or an underlying or overlying layer. With the introduction of a catalyst, an activation and thereby crackle formation can occur, for example, by irradiation. An example of a photoactive catalyst is titanium apatite, which can be activated by irradiation or electric voltage.

The crackle formation can be activated, initiated, promoted, accelerated, changed, or inhibited, apart from the use of solvents and/or binding agents, also by external influences, such as a cold and heat effect, drying and moisture effects, temperature change, light or oxygen treatment, ultrasound, induction, or electric voltage. In this case, individual areas of the crackle pattern-forming layer/s can be isolated by these effects, so that the change in the crackle pattern in these areas turns out to differ in intensity.

In another embodiment, a magnetic crackle can also be provided. In this case, preferably a magnetized grid is provided, which leads to a magnetization of metal pigments or a metal layer. Fine and coarse metal particles are attracted by the magnetized grid and migrate in its direction. Different crackle effects can be created by the use of iron and chromium and other fine metal granules. There is a high degree of security because of the randomness of the arising pattern. On the other hand, it is possible to limit or to control this randomness by the underlying magnetized layer and to allow a relatively selective crackle process to proceed, which in the extreme case even permits a precise age determination of the document.

In another embodiment, the crackle pattern-forming layer can be a transparent layer, in which the crackle pattern is barely or not at all detectable by the naked eye and in which the crackle pattern becomes visible only under certain conditions or with special methods. For example, the crackle pattern can become visible only in the presence of soiling or by application of pigments (dyeing) or metal powder, which settles in the fine tears and cracks. This type of crackle can combine visually after its soiling with a normal crackle such that overall a different crackle is seen. If the examination process is preceded by a cleaning process with a suitable agent, not known by a non-privy third-party, then the transparent layer becomes invisible again, optionally without being damaged thereby by the cleaning procedure. A pattern of this type can be made visible during the examination process, also only with the selection of a proper angle, a correct light source, or by selective limiting to a specific crackle color.

Conversely, the invisible crackle can be made selectively visible before the examination process by the use of the above methods and be made invisible again totally or partially after the examination process. If another layer with a crackle pattern is arranged below the transparent crackle pattern-forming layer, then the forger will be able only to detect this layer and achieve a false result with a copy.

In an embodiment, the crackle pattern formation or crackle formation can also be made reversible, so that the crackle pattern, as it were, is reset (set back) to the original state, as a result of which the crackle formation process can be begun or initiated again.

The restoration of the original state can be intended or prevented by the composition of the layer. In the case of the magnetized layer, it occurs preferably with the aid of the disruption or polarity reversal of the magnetized grid, so that the structure of the metal elements changes, or is dispersed again. Preferably, this self-healing process can be prevented, in that the metal particles are introduced into a layer which because of a drying process develops increasing adhesion forces over time, which bind the metal particles more or less strongly to their particular location.

The restoration of the original state can occur also by a self-healing process, which is reversible. For example, the crackle effect can be eliminated again partially or completely by heat or UV light. Also the application or introduction of special solvents can eliminate the crackle pattern effect partially or completely, for example, in that existing layers are dissolved or liquefied, so that the surface becomes smooth and the tear structure dissipates. The resetting can also be achieved by the redistribution of introduced particles, not necessarily the same distribution, as must be achieved at the beginning, but only a new distribution, which no longer matches the prior distribution. Instead of or together with such a redistribution, additional particles can also be newly introduced, for example, with the aid of the mentioned solvent.

A resetting or extension of a security marking is also possible by the application of a new layer onto already existing layers. A new layer with new security features (e.g., crackles, nicks, shrinkages) can be created in this way.

Another option is contacting with a catalyst or gassing. A temporarily valid document with the security element can be produced in this way. A high degree of copy security is achieved by the use of layers with different designs, which contain random as well as fixed components, particularly if at the particular issuing time a valid crackle pattern is stored and retrievable in a central database.

The crackle pattern-forming layer can be covered by one or more underlying and/or overlying layer(s). The top layer can be formed so that the crackle pattern is not visible or only partially visible to the human eye or appears different. In an embodiment, the crackle pattern-forming layer can be covered by a protective film, which lets through only light of a specific wavelength, in order to make visible the crackle pattern, the nicks, or the shrinkages.

The security element can be glued to a surface or introduced into a material such as a piece of fabric.

The bottom layer can be a glue layer, which makes it possible for the security element to adhere self-adhesively to any substrate. This layer is preferably formed so that the security element can no longer be removed. It is provided in another embodiment that a removal can occur only by using a previously established method, for example, after heating to a particular temperature or by treatment with a particular solvent.

An artificial crackle can be generated selectively by the selective buildup of different layers and modification thereof. Depending on the layer structure, a typical crackle pattern can be created, for example, a jagged, irregular, or spider web-like crackle. Artificially broken crackles often have a rectangular structure, because they are frequently broken in two directions. The mechanical embossing of a layer is also possible to create an artificial crackle. An embossing die or laser can be used as a tool. Depending on the material, the use of steam, heat, and water jet technology is also conceivable.

Crackle formation can be accelerated by the use of ultrasound. A treatment can occur, for example, after a reading process to prevent possibly existing copies from remaining undetected in a subsequent examination. The use of a point ultrasound source is preferable, so that only previously defined or randomly selected areas are treated. If these areas are included in a subsequent scanning operation and the database is updated, then it is not possible to forge this feature lastingly. Additional security is achieved by a defined selection of the areas to be scanned or by a selection with the use of an algorithm. In a variant, one of the layers can be formed so that it does not undergo any crackle pattern formation. Another variant can include a material that allows only individual changes, therefore, for example, forms crackles but no shrinkages or nicks.

In another variant, a final layer can be provided, which lies over the topmost layer and in itself does not form crackles. It can include a liquid or gel-like material. This material can be protected permanently or limited in time by a protective film before the drying, whereby in a preferred embodiment the protective film is removed for activating the security feature. In another embodiment, such a layer is formed over the crackle pattern-forming layer so that the crackle itself is no longer visible to the human eye. A visualization can occur, for example, by examination with infrared light, which further makes forgery much more difficult. In addition with some heating this layer can form its own crackle pattern or change its composition and thereby its appearance. The composition of the material is preferably such that in an attempt to remove the security element or to separate the layers, a component of the liquid or the gel destroys other layers, which provides further for an improved forgery security.

In an embodiment, individual or all tears in the uppermost crackle layer are covered by an additional adjacent protective layer. As a result, tears covered by this protective layer are preserved. In this regard, individual tears can be left out, so that they develop further optionally in a different way than the protected areas. In this way, there are both fixed and dynamic tears. The forger does not know which areas are now protected randomly or intentionally. The forger also does not know which areas of the security element, i.e., which crackle structures, are the final component of the subsequently performed scanning operation (scan). It is therefore impossible to imitate this security element, particularly if the scan range is slightly shifted in each reading procedure.

The security examination of the object or living being marked with the security element of the invention occurs basically based on structure data which describe the crackle pattern or parts thereof at a fixed point in time. These structure data are converted to a data set or a plurality of data sets, which is/are made available to one or more databases via one or more separate connecting paths. The new additional data sets are optionally updated anew with each examination. In a new examination, at least one part of the crackle pattern will have developed further since this point in time, whereas another part has the still characteristic structures. It can be determined from several scans whether it is a matter of an original or forgery. In this case, the scanned areas may not overlap or overlap singly or repeatedly. It is possible further that apart from the overlapping areas in addition an independent or several independent examination areas is/are scanned and acquired outside the overlapping. In this case, the security features acquired by the examination process or processes are compared with the features stored in one or more databases and changed or new features are stored. Based on such a scan, it is virtually impossible to imitate a crackle pattern successfully and particularly not to remain undetected over a longer time period.

The security element of the invention is preferably built up as having many layers. Apart from the crackle pattern layer, other security-relevant layers can be arranged above, below, and/or within the crackle pattern layer. One of the lowest layers can also be a stable support layer. The error rate is reduced still further by the combination of a crackle pattern layer with other security features; e.g., so-called false negatives can be avoided. A situation-related flexible identification of a person as part of an authentication also becomes possible.

The reading of the crackle pattern-forming layer can be influenced or even made possible partially or completely by the properties of a layer arranged above or beneath it.

Certain areas of one or more layers of the security element can be covered at least in areas. For example, a translucent or covering protective layer or varnish layer can be applied to the crackle layer, so that the crackle is not visible or only partially visible or even just then becomes visible, for example, under UV, IR, or normal light.

Another security factor can be used in the performed scanning operation in that different layers, arranged one above the other, are scanned at different light wavelengths. Depending on the reading procedure, crackle patterns can be made visible with normal light (380 to 780 nm), UV light (1 to 380 nm), or IR-A1 (780 to 1100 nm) or IR-A2 light (1100 to 1400 nm). For example, the topmost level can be scanned with an IR1 light source with a wavelength of 900 nm, so that only the crackle pattern of this layer is made visible. The layer below it and its crackle pattern can then be made visible with another wavelength of, for example, 1200 nm. Preferred IR ranges, with which different scans are run and which nonetheless are sufficiently spaced apart, occur at about 780 nm to about 1100 nm (IR-A1) and about 1100 nm to 1400 nm (IR-A2). An additional security factor, which can be used for the security element of the invention, is included by the combination of different wavelengths and/or measuring methods. The forger does not know which area is scanned when and with which wavelength and which crackle pattern (or other security feature or combination of security features) he has to expect or to evaluate.

The crackle pattern with its tears, nicks, shrinkages, wear and/or soiled areas, and optionally other security features in the same or different areas of a layer can be scanned and acquired with different measuring methods or parameters, whereby each measuring method or each parameter can provide its own data set, which together or separately is acquired and optionally updated in one or more existing databases. A separate transmission and/or storage of the data hereby increase very greatly the protection of data access by unauthorized third parties. The establishment of these parameters and the selection of measuring methods can be flexible. It can occur randomly or according to a predefined logic or algorithm.

In an embodiment, the crackle pattern, particularly the tears, nicks, wear areas, shrinkages, or soiled areas are scanned and acquired in different areas of a layer with different measuring methods or parameters, whereby each measuring method or each parameter can provide its own data set, which is acquired, stored, and read as needed or updated in one or more optionally independent databases, in one or more optionally independent transmission paths, whereby earlier data sets are optionally not overwritten, but supplemented by the new data and a new version number with a timestamp.

Another security feature can also be created by the selection of a specific scanning angle for the scanning device and/or the type and angle of incidence for the light used for scanning (e.g., polarized light, glancing or oblique light, or combinations thereof). Depending on the choice of light or the angle, the obtained picture of the crackle pattern can be different. This also applies to the use of fluorescent light and other types of light.

Therefore, the crackle pattern can be scanned and acquired at a variable scanning angle and/or angle of incidence, whereby the scanning angle/angle of incidence and/or the scanning wavelength can be optionally included as additional security features in the database/s.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
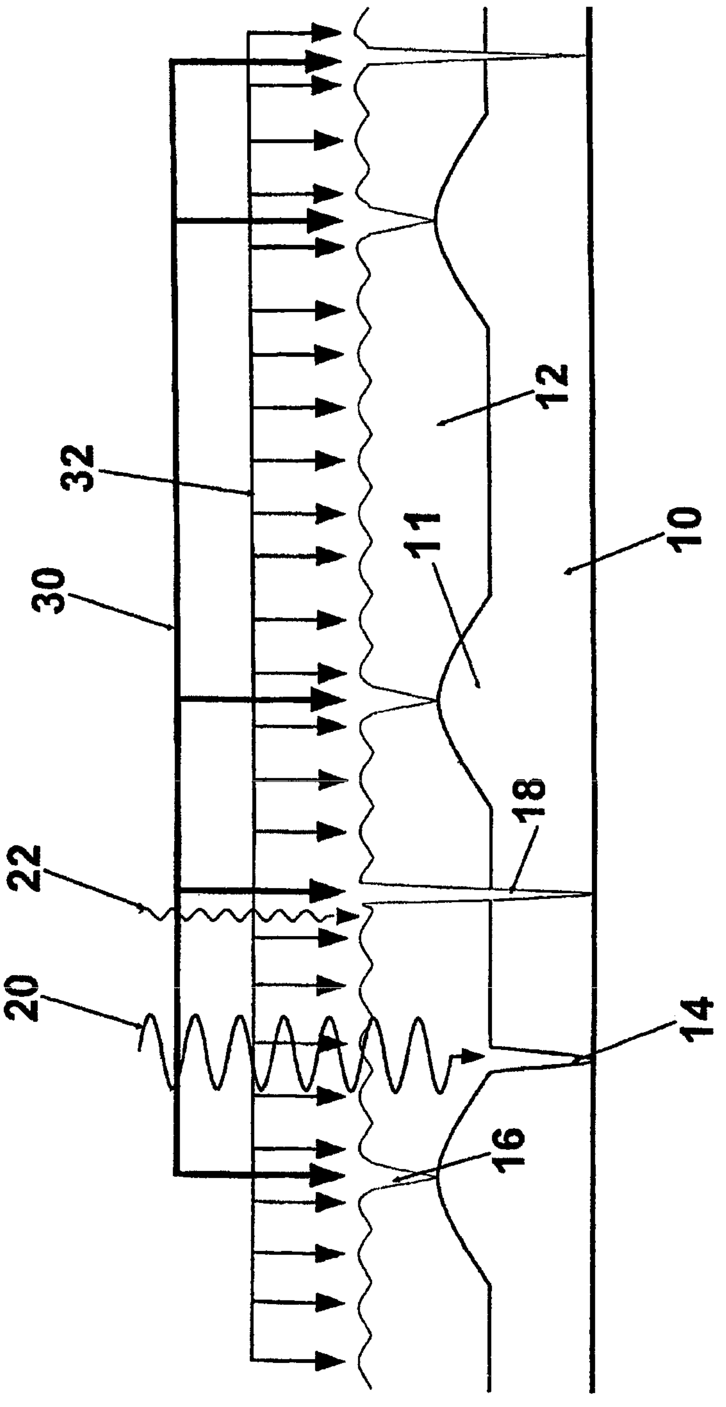
FIG. 1 shows the basic structure of a security element with crackle layers and its analysis/examination/scanning (scan)

In FIG. 1, two crackle layers 10, 12 are arranged one above the other. The individual crackle layers 10, 12 form varyingly pronounced tears or cracks 14, 16, 18. Depending on the extent, the tears of the topmost layer 12 can pass through to the underlying layer 10 as a single tear (cf. tear 18). Tears 16 can arise in the topmost layer 12 because of the drying process. Such tears can arise, for example, also by the drying or shrinking 11 of the underlying layer 10. Naturally, also an overlying layer can influence an underlying layer and cause stress cracks. Depending on the employed method, tears can be introduced selectively in this way to create a crackle. If a layer shrinks, it can also form furrows, which are similarly characteristic like crackle structures. As a result, shrinkages can also be used as a security feature, apart from or in addition to the crackle structures.

The individual layers 10, 12 can be scanned by different measuring methods for data acquisition or identification. In this case, the individual tears 14, 16, 18 can be scanned with light of a different quality and wavelength or at different angles of incidence/scan angles, as shown in the present embodiment. Depending on the wavelength, in this way different tear fractions can be seen in the individual layers 10, 12. In the shown embodiment, the topmost layer 12 is scanned with a first wavelength 22 (normal light), as a result of which crackle tears 16, 18 of said layer 12 are made visible. The topmost layer 12 is configured such that only infrared rays with a wavelength 20 pass through. Crackle tears 14 of the underlying layer 10 can be made visible with this second wavelength 20 (e.g., IR light at 900 nm or 1200 nm). With the thus obtained structure data, a forgery-proof security feature is available which cannot be imitated. The forger does not know at which wavelength a scanning is to occur in order to generate a specific picture of the crackle pattern. The scanning angle or the angle of incidence for the light can be used as another security feature. Depending on the angle, a different picture of the crackle pattern is obtained. The provision of the angle represents another security feature. Moreover, the angle can be recalculated for the next examination using an algorithm individually in each examination and other scans for data acquisition for a subsequent examination can occur. The angle can also be established manually. Furthermore, the examination result can also be compared with an existing 3D image of the crackle pattern. The crackle formation can be initiated, accelerated, or changed in certain areas by simple mechanical treatment or treatment with ultrasound.

Figure 2:
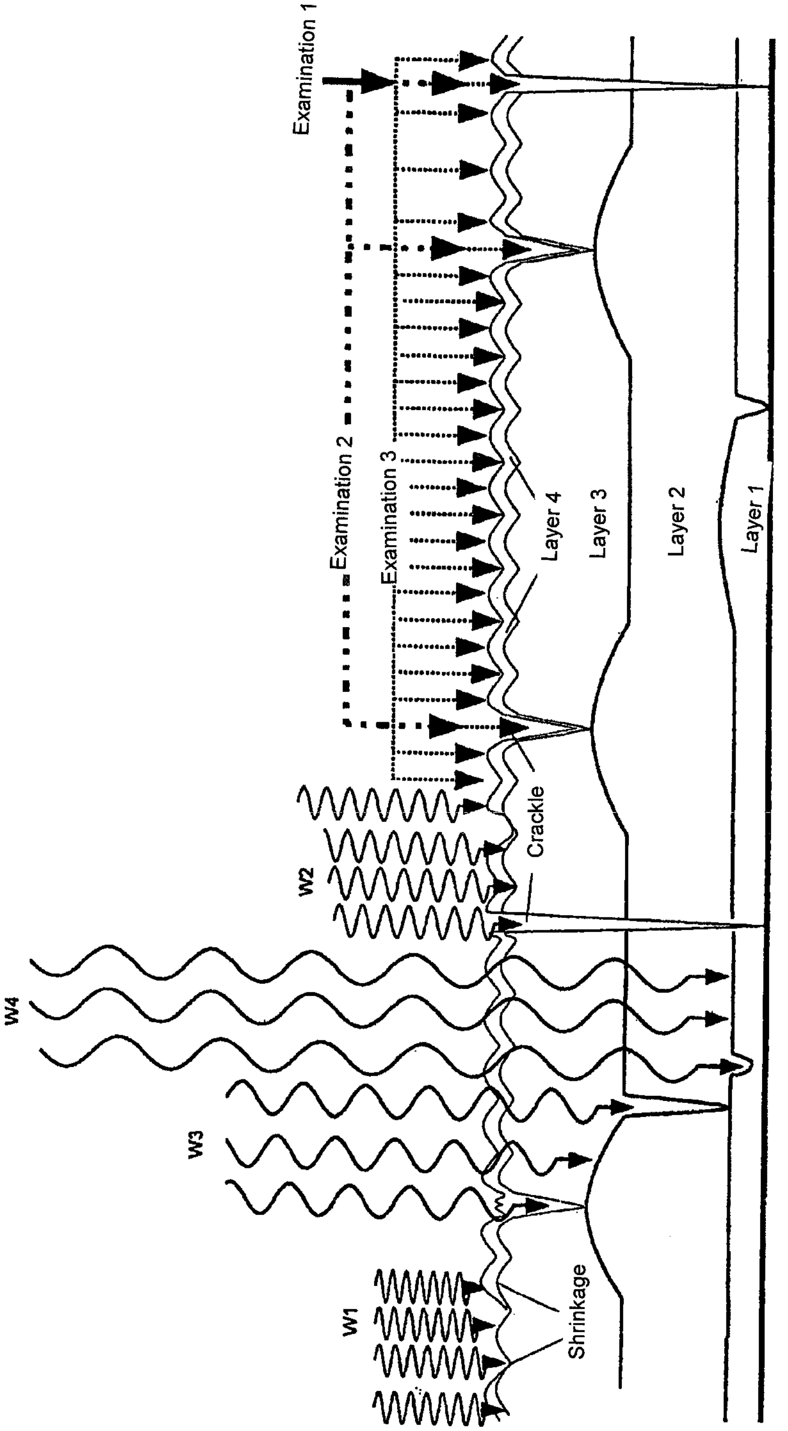
FIG. 2 shows another structure and methods for examining a security element.

A multilayer security element can be seen in FIG. 2. Individual tears and cracks are visible as crackle in the individual layers. In the topmost layer 4, moreover, places can be seen where there are traces of use, nicks have occurred, or which remain uncovered. Crackle tears and buckling are visible in layer 3 below it caused by drying, aging, or wear processes. For the examination, first a matching feature from the database is scanned for the first examination procedure (examination 1). In this second examination, the area to be examined is increased and other crackles are acquired (examination 2). In the third examination, the actual state of the surface is determined and other features are included, for example, other crackle structures, shrinkages, or surface pattern. A high security standard is achieved by this constant updating of an already existing database and comparison of the examination results of a subsequent examination with those from a previous examination. Examination steps 1-3 can also be performed individually or in another sequence or combination with other examination steps.

A method for increasing the security and creation of other security features is the use of testing devices with different wavelength ranges during one of the examination steps 1-3 or by supplementing with other examination steps (processes). The individual examination processes at the indicated wavelengths W1 (1 to 380 nm, UV-A to UV-C), W2 (380 to 780 nm, normal light), W3 (780 to 1100 nm, IR-A1), and W4 (1100 to 1400 nm, IR-A2) are shown. IR-A3 covers the range 1400 nm-1700 nm and is not shown here. Protective films such as protective coatings can be scanned, for example, at a first wavelength W1, therefore visibly with UV light, and show changes or a pattern otherwise not visible to the eye. Shrinkages can be scanned visibly with normal light (W2). These are characterized by furrows, which can be attributed, for example, to high binding agent fractions. At the wavelength W1 or W3, depending on the quality of the protective coating, the crackle of the underlying layer can be made visible and analyzed, if it was covered or filled, for example, by the protective coating and was not visible for W2. The shown crackle tear extends up to the lowest layer 1. To make the crackle pattern of the intermediate layers visible, which are covered by overlying or underlying layers, preferably scanning methods in the infrared range (IR) are used. In a scanning operation at the wavelength W3, for example, especially the crackle pattern of the topmost layers 2 and 3 can be made visible. The crackle of the underlying layer 1 remains hidden. A subsequent scanning operation at a wavelength W4 then also brings out crackle patterns formed in the lowest layer 1. The individual data enter the databases and are preferably updated anew with each scanning procedure.

The security can be increased still further in that not only the wavelength of the scanning light is varied but also the scanning angle. Depending on the angular degree, different crackle patterns or shrinkage patterns can arise. The forger is completely unaware of the angular degree, scanning or irradiated areas, or wavelengths, so that it is virtually impossible for him to pass a security examination. The crackle formation, moreover, can be influenced, for example, by ultrasound, so that sampling time periods closely spaced together enable different patterns.

The shown multilayer security element can be applied to any surface. Preferably, an adhesive surface on the front or back side is used for this purpose.

Figure 3:
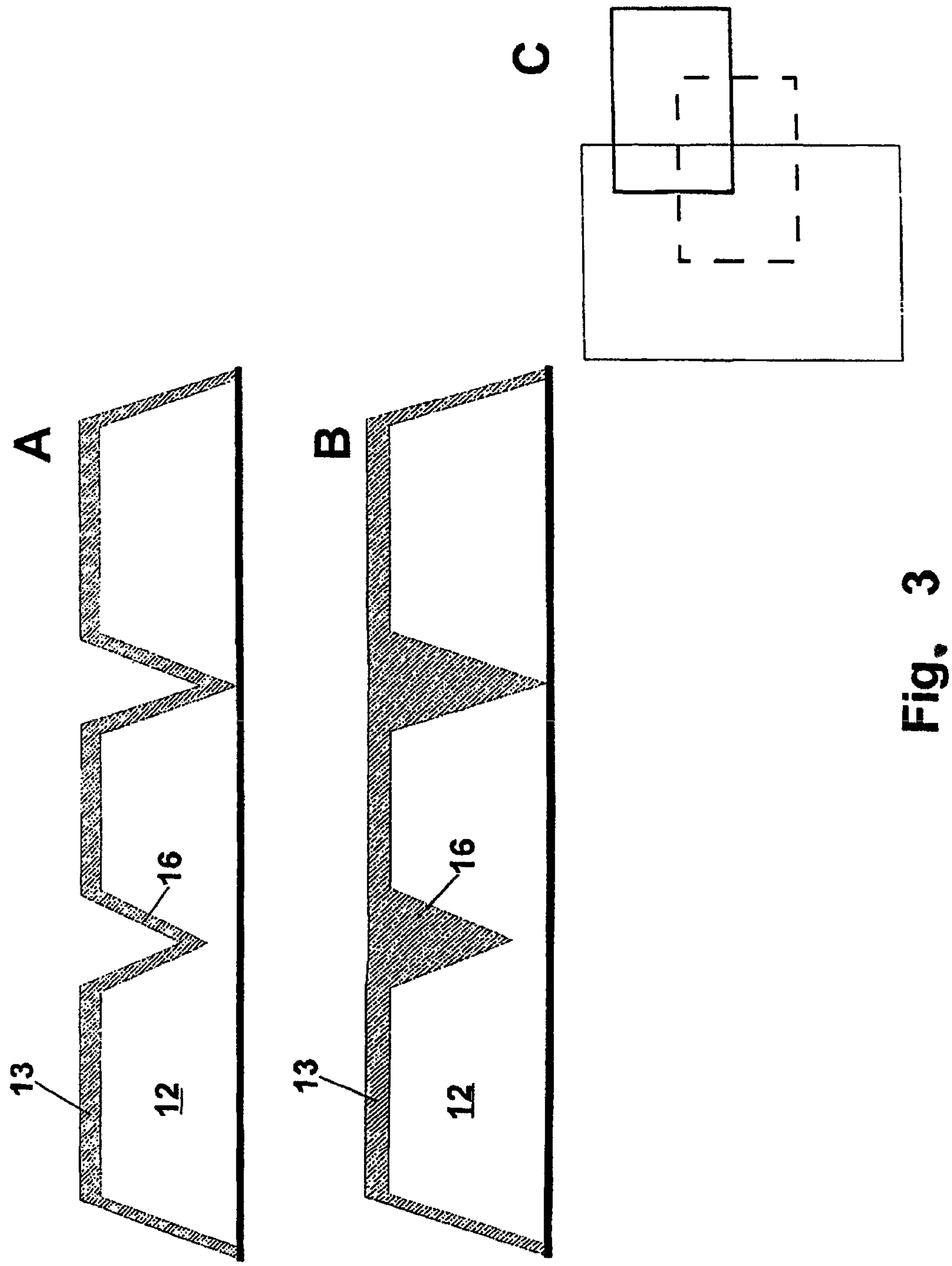
FIG. 3 shows the arrangement of a crackle layer with an overlying protective layer.

In FIG. 3A, crackle layer 12 is covered by another protective layer 13. The individual tears 16 of crackle layer 12 are protected in this way. Protective layer 13 can also be used, however, to completely fill or to cover individual tears intentionally (see FIG. 3B), as a result of which another security feature is created. The forger does not know which tears have been covered randomly and which intentionally by protective layer 13. The covered areas can be made visible only with specific methods.

For example, the examination and selection of the wavelengths can occur so that the crackle (or shrinkage) arranged below protective layer 13 is not visible to normal light. Protective layer 13 shields the crackle effectively. The crackle pattern becomes visible only with the aid of other analytical methods (e.g., IR light of a certain wavelength, IR-A1 or IR-A2). The use of UV rays, polarized light, fluorescence, luminescence, and x-radiation for visualizing a crackle pattern is also conceivable, whereby the scanning angle and angle of incidence can be varied.

Various examination methods are shown in FIG. 3C. During each examination process, overlapping with already examined areas occurs, but also for the scanning of new examination areas not yet included in the database. A forgery-proof security medium is created in this way and by the ongoing periodic updating. In another embodiment variant, independent additional areas can also be used or overlapping can be omitted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for marking, authenticating, or identifying objects, comprising:

scanning and acquiring one or more layers, arranged next to or above one another or overlapping layer of materials, where at least one layer, at least in areas, contains security markings, wherein, the security markings include a crackle pattern in the form of tears or cracks, nicks, wear areas, shrinkages or soiled areas that are generated, influenced, or made manipulable, wherein said crackle pattern is scanned and acquired as a security feature, and data obtained by the scan is compared with one or more databases in one or more optionally separate transmission paths, and wherein the crackle pattern is a crack having a depth and a width and, at least in areas, undergoes a dynamic change process, as a result of which changes in the crackle pattern arise and are acquired.

2. The method according to claim 1, wherein the security features acquired by an examination process or examination processes are compared with features stored in one or more databases and changed or new features are stored.

3. The method according to claim 1, wherein the crackle pattern is scanned and acquired in different areas of a layer with different measuring methods or parameters, whereby each measuring method or parameter can provide its own data set, which is acquired, stored, and read as needed or updated in one or more optionally independent databases, in one or more optionally independent transmission paths, and wherein earlier data sets are not overwritten, but supplemented by the new data and a new version number with a timestamp.

4. The method according to claim 1, wherein the crackle pattern is scanned and acquired at a variable scanning angle and/or angle of incidence, and wherein the scanning angle/angle of incidence and/or the scanning wavelength is/are included optionally as additional security features in the database.

5. The method according to claim 1, wherein the changes in the crackle pattern arise over time.

6. The method according to claim 1, wherein the data acquired describe the crackle pattern or parts of the crackle pattern at a fixed point and time.

7. The method according to claim 1, wherein the crackle pattern is generated or influenced physically, magnetically or chemically.

8. The method according to claim 1, wherein the crackle pattern is generated, influenced, or made manipulable by primary or secondary drying, use or wear, heat effect, drying and moisture effects, temperature change, light or oxygen treatment, ultrasound treatment, soiling, cleaning, magnetism, electromagnetic induction, electric voltage, or current.

9. The method according to claim 1, wherein the crackle pattern is generated, influenced, or made manipulable by a colorant, a solvent, or binding agent or by solvent- and binding agent-containing substances or mixtures thereof.

10. The method according to claim 9, wherein the crackle pattern is generated, influenced, or made manipulable by asphalt, tar, bitumen, oils, fats, resins, waxes, natural or synthetic polymers, oxidants, or related substances, or mixtures thereof.

11. The method according to claim 1, wherein the crackle pattern in a layer is generated, influenced, or made manipulable by a layer arranged above or beneath it.

12. A security system for authenticating or identifying objects or living beings, the security system comprising:

a security element attached to an object or living being; and a scanning device that scans the security element to authenticate or identify the object or living being, wherein the security element comprises:

one or more layers arranged next to or above one another or overlapping layers of materials, wherein at least one layer of the security element, at least in areas, is provided with a crackle pattern in the form of tears or cracks, nicks, wear areas, shrinkages, or soiled areas, which form a security feature that is scannable and readable by the scanning device, wherein the crackle pattern provided in the at least one layer of the security element is, at least in areas, dynamic, such that changes in the crackle pattern arise over time, and wherein the crackle pattern is a crack having a depth and a width and, at least in areas, undergoes a dynamic change process, as a result of which changes in the crackle pattern arise and are acquired.

13. The security system according to claim 12, wherein the layer containing the crackle pattern is transparent and not visible to the naked eye.

14. The security system according to claim 12, wherein the crackle pattern extends across several layers, whereby the layers can be either the same or different in their structure or composition.

15. The security system according to claim 12, wherein the crackle pattern or parts thereof are fixed chemically or physically at least in areas.

16. The security system according to claim 12, wherein the crackle pattern is reversible.

17. The security system according to claim 12, wherein the layer containing the crackle pattern is covered by a protective film, which lets through only light of a specific wavelength, in order to make the crackle pattern visible or not visible.

18. The security system according to claim 12, further comprising a database that stores the scanned security feature and by which the scanned security feature is compared with previously stored security features.

19. The security system according to claim 12, wherein data obtained by the scan of the crackle pattern is compared with one or more databases in one or more optionally separate transmission paths.

20. The method according to claim 1, wherein the objects include documents, securities, stamps, labels, bank bills, bank notes, identity documents, personal identity cards, other ID cards, passports, chip cards, access cards, credit cards, access control cards, tickets, driver's licenses, vehicle documents, bank notes, checks, postage stamps, labels, vignettes, paintings, art objects, furniture, measuring devices, machine parts, machines, vehicles, cameras, cell phones, computers, computer-like devices, data storage media, printed materials, books, fabric, fashion items and sporting goods, technical devices, tools, paper and cardboard boxes, packaging, as well as products and the like, or living beings.

* * * * *